(12) United States Patent
Tarakçi et al.

(10) Patent No.: US 11,630,118 B2
(45) Date of Patent: Apr. 18, 2023

(54) SYSTEM FOR DETERMINING REVOLUTIONS IN DRIVE SHAFTS, A CARDAN SHAFT RELATED TO SAID SYSTEM AND DETERMINING METHOD THEREOF

(71) Applicant: TIRSAN KARDAN SANAYI VE TICARET ANONIM SIRKETI, Manisa (TR)

(72) Inventors: Sedat Tarakçi, Manisa (TR); Serhan Özdemir, Izmir (TR)

(*) Notice: Subject to any disclaimer, the term of this patent is extended or adjusted under 35 U.S.C. 154(b) by 311 days.

(21) Appl. No.: 16/771,171

(22) PCT Filed: Jun. 20, 2019

(86) PCT No.: PCT/TR2019/050481
§ 371 (c)(1),
(2) Date: Jun. 9, 2020

(87) PCT Pub. No.: WO2020/013787
PCT Pub. Date: Jan. 16, 2020

(65) Prior Publication Data
US 2021/0165014 A1    Jun. 3, 2021

(30) Foreign Application Priority Data
Jun. 20, 2018    (TR) .................................. 2018/08777

(51) Int. Cl.
*G01P 3/487*    (2006.01)
*B60K 17/22*    (2006.01)
*G01P 3/44*    (2006.01)

(52) U.S. Cl.
CPC .............. *G01P 3/487* (2013.01); *B60K 17/22* (2013.01); *G01P 3/443* (2013.01); *F16C 2233/00* (2013.01); *F16C 2326/06* (2013.01)

(58) Field of Classification Search
CPC ................ F16C 41/007; F16C 2233/00; F16C 2326/06; F16C 2361/41; G01P 3/443;
(Continued)

(56) References Cited

U.S. PATENT DOCUMENTS

| | | | | |
|---|---|---|---|---|
| 3,947,712 A | * | 3/1976 | Burckhardt | G01P 3/488 310/168 |
| 6,283,666 B1 | * | 9/2001 | Genequand | F16C 11/12 439/492 |

(Continued)

FOREIGN PATENT DOCUMENTS

| | | | |
|---|---|---|---|
| CN | 1803488 A | * 7/2006 | ............. B21D 26/14 |
| CN | 206469891 U | 9/2017 | |

(Continued)

OTHER PUBLICATIONS

International Search Report for corresponding PCT/TR2019/050481.
Written Opinion of the ISA for corresponding PCT/TR2019/050481.

*Primary Examiner* — Phillip A Johnson
(74) *Attorney, Agent, or Firm* — Egbert, McDaniel & Swartz, PLLC

(57) ABSTRACT

A system for determining the number of revolutions of a cardan shaft, having at least a magnet and at least a hall sensor is positioned to provide magnetic interaction between them, characterized by connecting one of the magnet and hall sensor onto either the rotating elements of the cardan shaft and the other to a fixed point and including a detection element for detecting the revolution rate by correlating to the revolution and the pulse created by the hall sensor as a result of interaction between the magnet and the hall sensor, when the cardan shaft rotates.

1 Claim, 8 Drawing Sheets

(58) Field of Classification Search
CPC .......... G01P 3/487; F16D 3/382; F16D 3/385; F16D 3/387; B60K 17/22
See application file for complete search history.

(56) References Cited

U.S. PATENT DOCUMENTS

| | | | |
|---|---|---|---|
| 2005/0088037 A1* | 4/2005 | Beutler | B60B 35/18 301/124.1 |
| 2006/0257268 A1* | 11/2006 | Reimer | F04B 1/122 417/269 |
| 2011/0048224 A1 | 3/2011 | Dunn et al. | |
| 2016/0005246 A1 | 1/2016 | Baker | |

FOREIGN PATENT DOCUMENTS

| | | | | |
|---|---|---|---|---|
| DE | 4002035 A1 * | 8/1990 | | |
| DE | 102018104727 A1 * | 9/2018 | ............. | B60K 17/24 |
| EP | 0631141 A | 12/1994 | | |
| FR | 3016607 A1 * | 7/2015 | ........... | B64C 13/341 |
| JP | 2012222927 A | 11/2012 | | |

\* cited by examiner

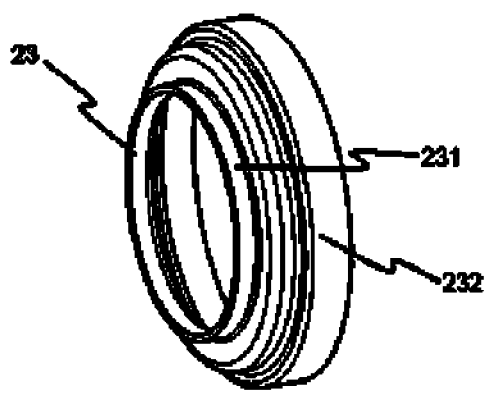
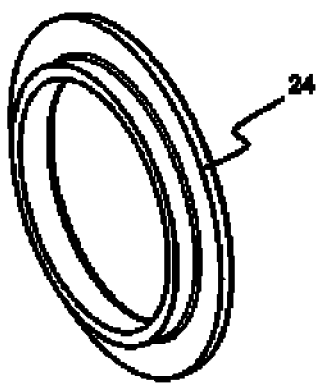
FIGURE 5.A
FIGURE 5.B
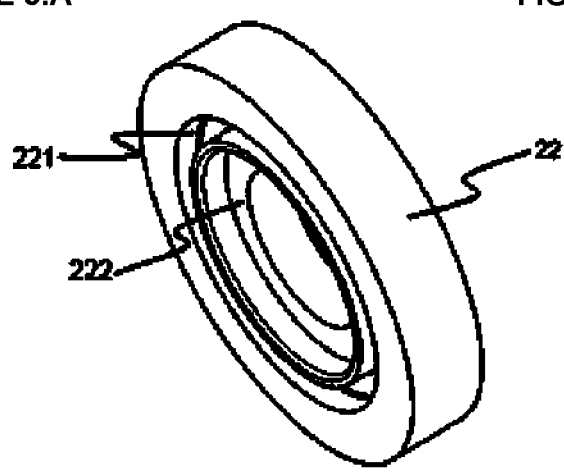
FIGURE 5.C

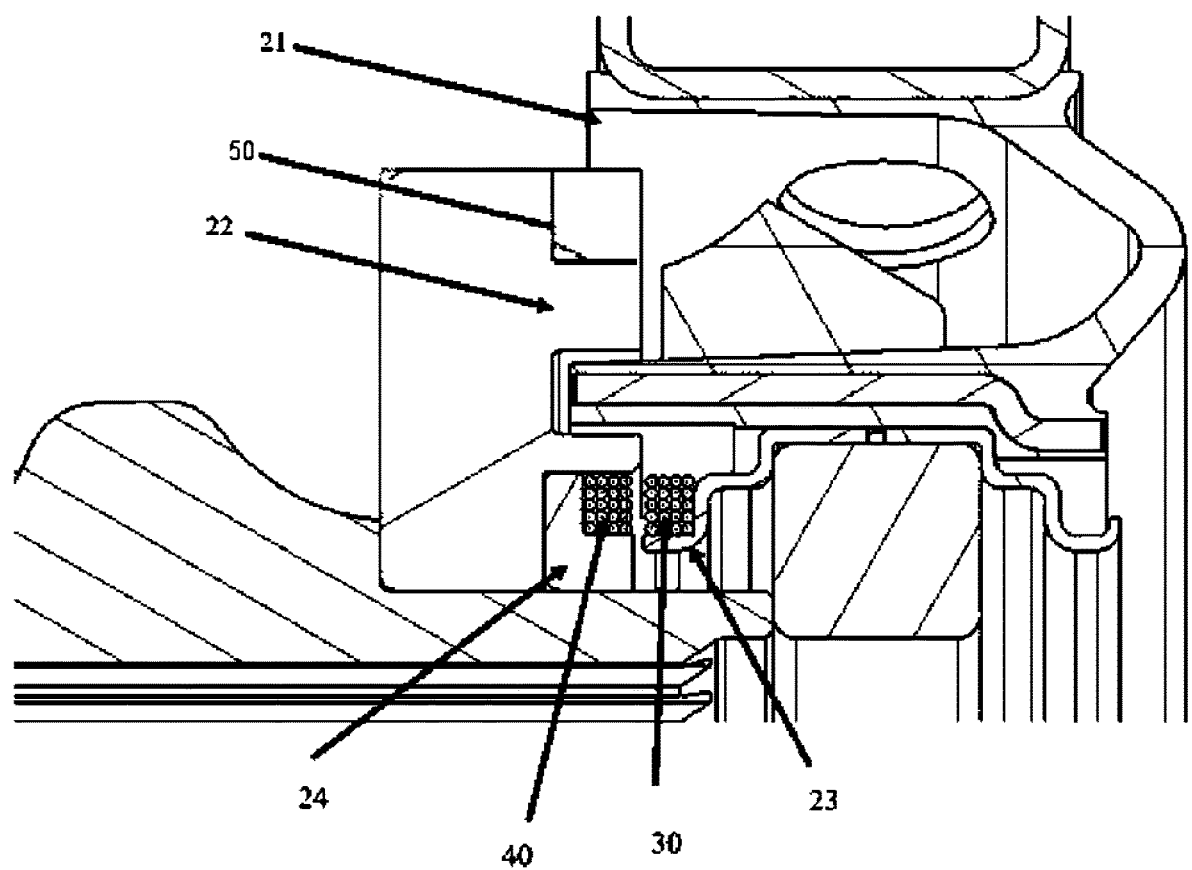
FIGURE 6.A

SYSTEM FOR DETERMINING REVOLUTIONS IN DRIVE SHAFTS, A CARDAN SHAFT RELATED TO SAID SYSTEM AND DETERMINING METHOD THEREOF

TECHNICAL FIELD

The invention relates, in particular, to a system for determining revolutions in cardan shafts using magnetic interaction, a cardan shaft related to said system and a cardan shaft revolution determining method.

PRIOR ART

Cardan shafts are powertrain members which are used in motor vehicles to receive rotating motion and power from the engine or transmission and to transmit said motion and power to the differential of the vehicle.

The mentioned amount of rotating motion, in other words number of revolutions is considered to an important input for the general design in cardan shafts. The mentioned input cannot be obtained with a system integrated on the cardan shaft. In particular, the difficulty in establishing a stable system on the cardan shaft, which ensures that the detection elements cannot be protected from environmental conditions and that provides continuous rotation, causes the related technical problem to arise. Nowadays, although, the number of revolutions is determined according to predictions or simulations that are optimized according to various environmental conditions and mechanisms, the aforementioned methods are not sufficient to fully reflect the field conditions.

As a result, the problems mentioned above and which cannot be solved in the light of the current technique, has made it necessary for an innovation to be carried out in the relevant technical field.

AIM OF THE INVENTION

The present invention aims to eliminate the aforementioned problems and to provide a technical innovation in the related field.

The main objective of the invention is to provide a system for determining the number of revolutions of a cardan shaft using magnetic interaction, a cardan shaft related to the system and a cardan shaft revolution determining method.

An another object of the invention to ensure that the number of revolutions of the cardan shafts is determined under real field conditions when the cardan shaft is in use, and to provide reliable inputs that are used in designing cardan shafts that are to be produced.

A further object of the invention is to provide an optimum design structure of the elements placed on the cardan shaft to provide the related interaction.

BRIEF DESCRIPTION OF THE INVENTION

In order to accomplish all of the aims that can be construed from the information given above from the following detailed description, the present invention is a system for determining the number of revolutions of the cardan shaft, comprising at least a magnet and at least a hall sensor is positioned to provide magnetic interaction between them. Accordingly,
connecting one of said magnet and hall sensor onto either the rotating elements of the cardan shaft and the other to a fixed point and
comprising a detection element for detecting the revolution rate by correlating to the revolution and the pulse created by the hall sensor as a result of interaction between the magnet and the hall sensor, when the cardan shaft rotates.

In a preferred embodiment of the invention, said fixed point is a central bearing positioned on the cardan shaft.

In a preferred embodiment of the invention, the invention comprises a fixed carrier which is positioned on said central bearing which carries the magnet or the hall sensor such that it does not come into contact with the rotating elements of the cardan shaft and therefore is enabled to stay fixed.

Another preferred embodiment of the invention comprises a carrier surface for said fixed carrier which enables the magnet and the hall sensor to be positioned across from each other at the same level in order to provide utmost magnetic interaction efficiency.

In a preferred embodiment of the invention, said fixed carrier comprises at least one central bearing mounting surface which is mounted on the central bearing.

A preferred embodiment of the invention comprises a rotating carrier which carries the magnet or the hall sensor and is positioned on the cardan shaft and rotates with the cardan shaft.

Another preferred embodiment of the present invention comprises a protective element comprising a first groove configured to corresponding to the geometry of the central bearing.

In a preferred embodiment of the invention, the protective element comprises a first groove configured to corresponding to the central bearing geometry.

In a preferred embodiment of the invention, the protective element comprises a second groove configured to corresponding to the rotating carrier geometry.

In a preferred embodiment of the invention, the protective element and rotating carrier is positioned on the mounting surface that is configured on the cardan shaft.

In a preferred embodiment of the invention, the protective element on the cardan shaft is fixed in position by contacting the configured retaining face.

In order to reach all of the objectives that can be construed from the descriptions above and the following detailed description, the present invention is a cardan shaft integrated with a system that is suitable to any of the above-described embodiments.

In order to reach all of the objectives that can be construed from the descriptions above and the following detailed description, the present invention is method for determining the number of revolutions of the cardan shaft, at least one magnet (30) and at least one hall sensor (40), which is positioned to provide magnetic interaction between each other, is used Accordingly it comprises the following steps;
a) connecting one of said magnet and hall sensor onto either the rotating elements of the cardan shaft and the other to a fixed point, and
b) determining the number of pulses created by the hall sensor and;
c) determining the number of revolutions by correlating the number of pulses with the number of revolutions.

BRIEF DESCRIPTION OF THE FIGURES

FIGS. 5a, 5b, 5c are views of the fixed carrier, rotating carrier and protective element, respectively.

FIG. 6a is a detailed sectional view of the mechanical structure according to the invention that is adapted onto a cardan shaft.

REFERENCE NUMBERS

10. Cardan shaft element
    11. Retaining Face
    12. Mounting surface
20. Mechanical structure
    21. Central Bearing
    22. Protective element
        221. First groove
        222. Second groove
    23. Fixed carrier
        231. Carrier surface
        232. Central bearing mounting surface
    24. Rotating Carrier
30. Magnet
40. Hall Sensor
50. Detection element
SN. Fixed point

DETAILED DESCRIPTION OF THE INVENTION

In this detailed description, a system for determining the number of revolutions of the cardan shaft according to the invention, a cardan shaft with the related system and the method of determination are disclosed by illustration in order to provide a better understanding of the subject which should not be deemed to have a limiting effect.

The invention relates to a system which provides the number of revolutions of the cardan shaft using magnetic interaction subject to the invention, a cardan shaft of the related system and a cardan shaft revolution detection method.

The invention
is a system for determining the number of revolutions of the cardan shaft, comprising at least a magnet (30) and at least a hall sensor (40) is positioned to provide magnetic interaction between them characterized by;
connecting one of said magnet (30) and hall sensor (40) onto either the rotating elements of the cardan shaft and the other to a fixed point (SN) and
comprising a detection element (50) for detecting the revolution rate by correlating to the revolution and the pulse created by the hall sensor (40) as a result of interaction between the magnet (30) and the hall sensor (40), when the cardan shaft rotates.

Figure 1:
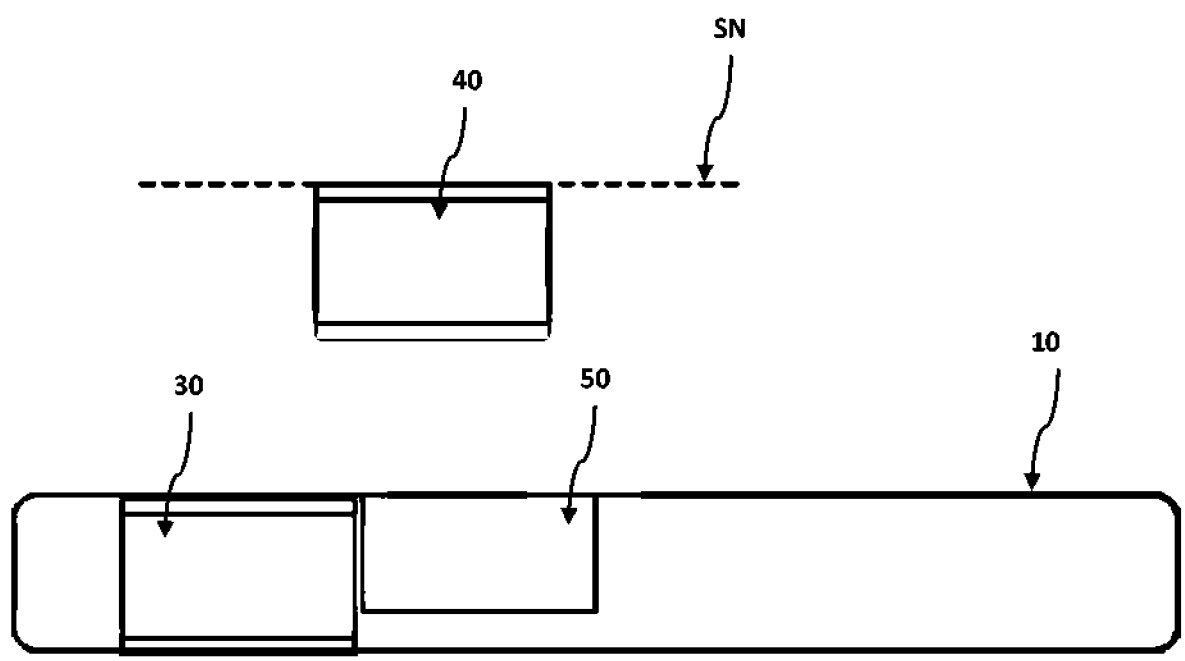
FIG. 1 is a schematic view of an embodiment of the system according to the invention.
Figure 2:
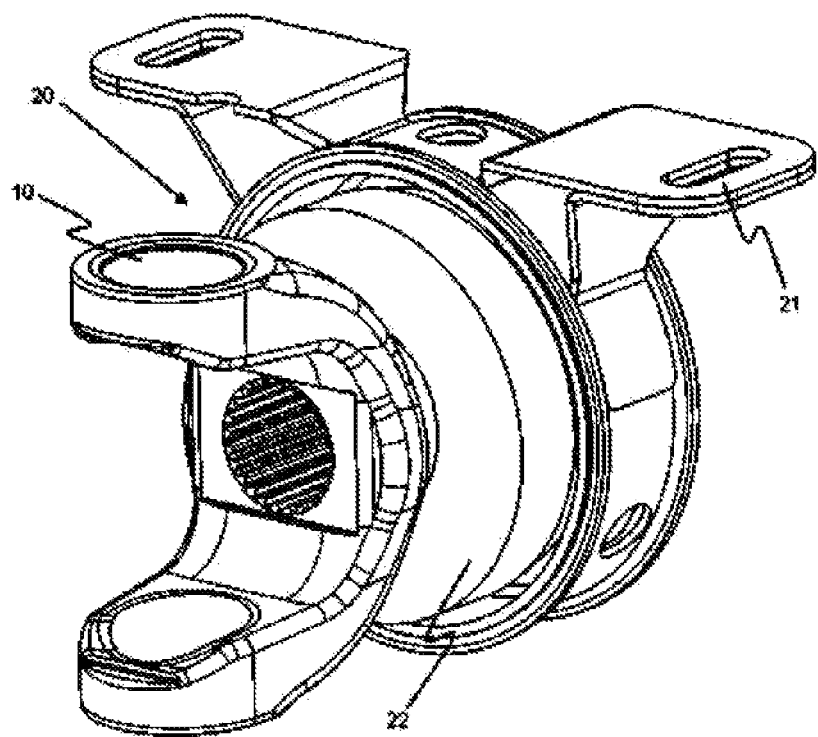
FIG. 2 is the rear view of the mechanical structure subject to the invention that is adapted onto a cardan shaft.

FIG. 1 shows a schematic view of one embodiment of the system according to the invention. In the embodiment shown, the magnet (30) is connected to the rotating element of the cardan shaft, that is to say, to the cardan shaft element (10). While this positioning is not a must, the magnet (30) may be positioned on any of the means of the cardan shaft that provides rotating movement. The hall sensor (40) is connected to a fixed point (SN). The fixed point (SN) may preferably be selected as the central bearing (21) that is illustrated in FIG. 2. In this case, the positioning of the magnet (30) and the hall sensor (40), can be vice-versa.

The magnet (30) and hall sensor (40) are positioned such that magnetic interaction is provided between them. When the cardan shaft starts to rotate, the magnet (30) and the hall sensor (40) come face to face at certain intervals and as a result of this encounter the hall sensor (40) creates a pulse. When different numbers of magnets (30) and hall sensors are used in the system, the number of revolutions per pulse shall also change accordingly.

The detection element (50) can determine the number of pulses for each revolution and can calculate the momentary number of revolutions of the cardan shaft.

FIG. 2 illustrates a mechanical structure (20) for integrating the system of the invention to the cardan shaft, in particular to the cardan shaft element (10), which comprises a central bearing (21). The central bearing (21) can be used as a fixed point (SN) for the invention in addition to the fact that the cardan shafts have a bearing in the middle in order to provide contact with the chassis on the vehicle and to provide the necessary support. Said detection element (50) may be positioned on the respective central bearing (21) or on the cardan shaft element (10).

It has already been mentioned that the system for revolution determination comprises at least a magnet (30) and a hall sensor (40). At least one of the magnet (30) and hall sensors (40) need to be fixed and the other to be moving for generating the pulse per said revolution. One of the basic functions of the mechanical structure (20) is to ensure that either the magnet (30) or the hall sensor (40) remains fixed, even when the cardan shaft is in motion. The pulse generation process is continued by means of magnetic interaction by means of the magnet (30) or the hall sensor (40) which is positioned on the cardan shaft element (10) and rotates together with it. Thus, the continuity of the magnetic interaction is ensured and the data transfer via the cardan shaft can be kept constant. Another important function of the mechanical structure (20) is to protect said at least one magnet (30) and hall sensor (40) and the detection element (50) from environmental conditions.

Figure 3:
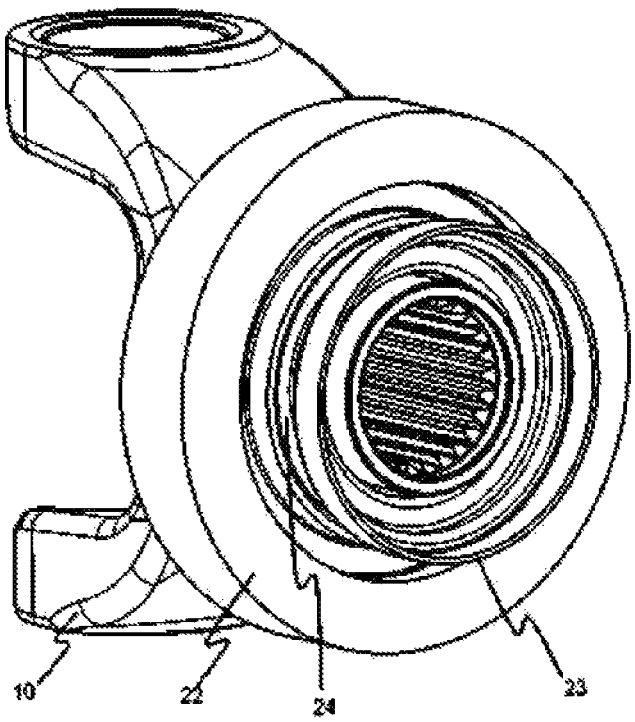
FIG. 3 is a front view of the mechanical structure according to the invention that is adapted onto a cardan shaft.

As can be seen in FIG. 3, the mechanical structure (20) comprises a central bearing (21), a protective element (22) which envelopes the detection element (50), a fixed carrier (23) in which the hall sensor (40) is positioned, and a rotating carrier (24) in which the magnet (30) is positioned.

Figure 4:
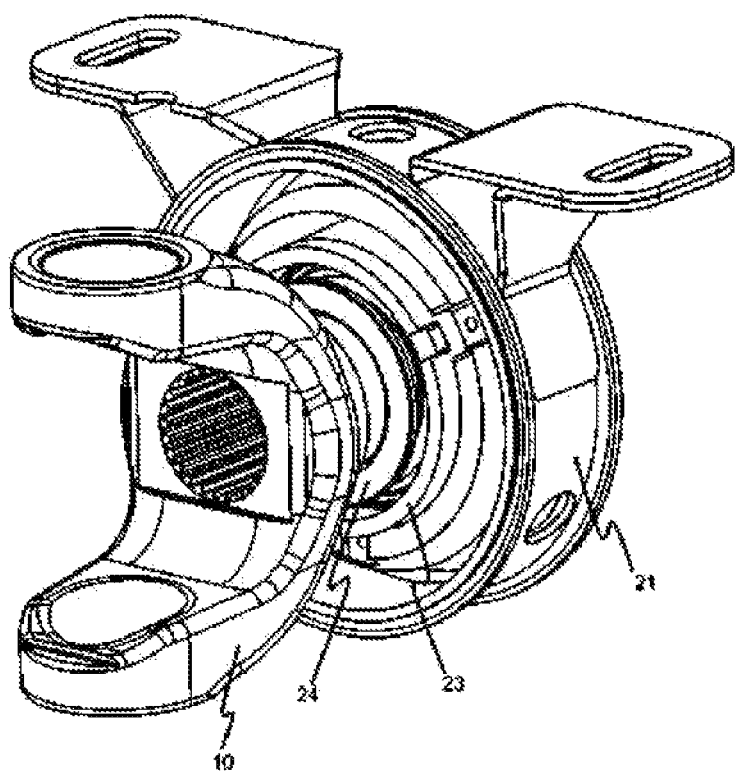
FIG. 4 is a view of the mechanical structure according to the invention that is adapted onto a cardan shaft.
Figure 6:
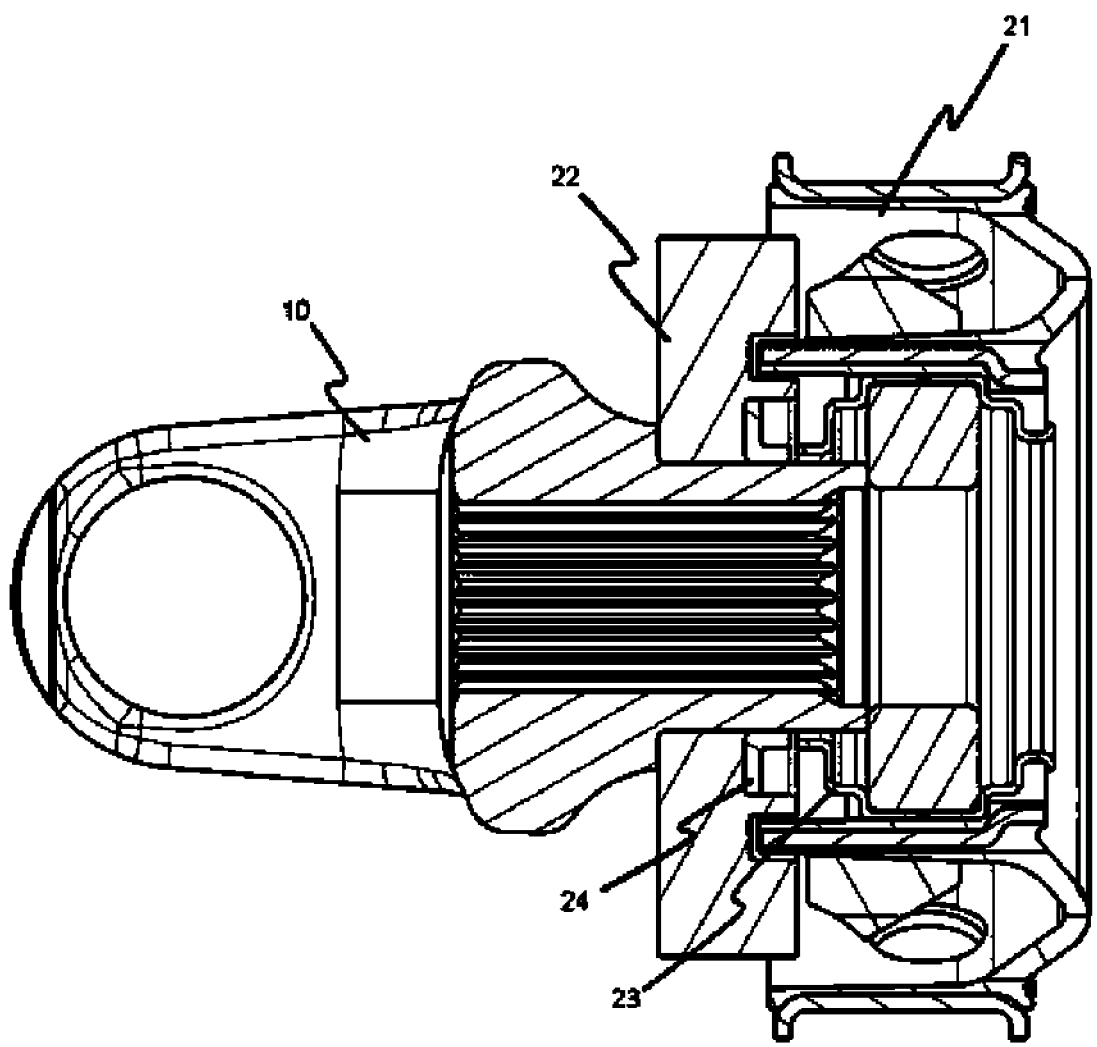
FIG. 6 is a cross-sectional view of the mechanical structure according to the invention that is adapted onto a cardan shaft.
Figure 7:
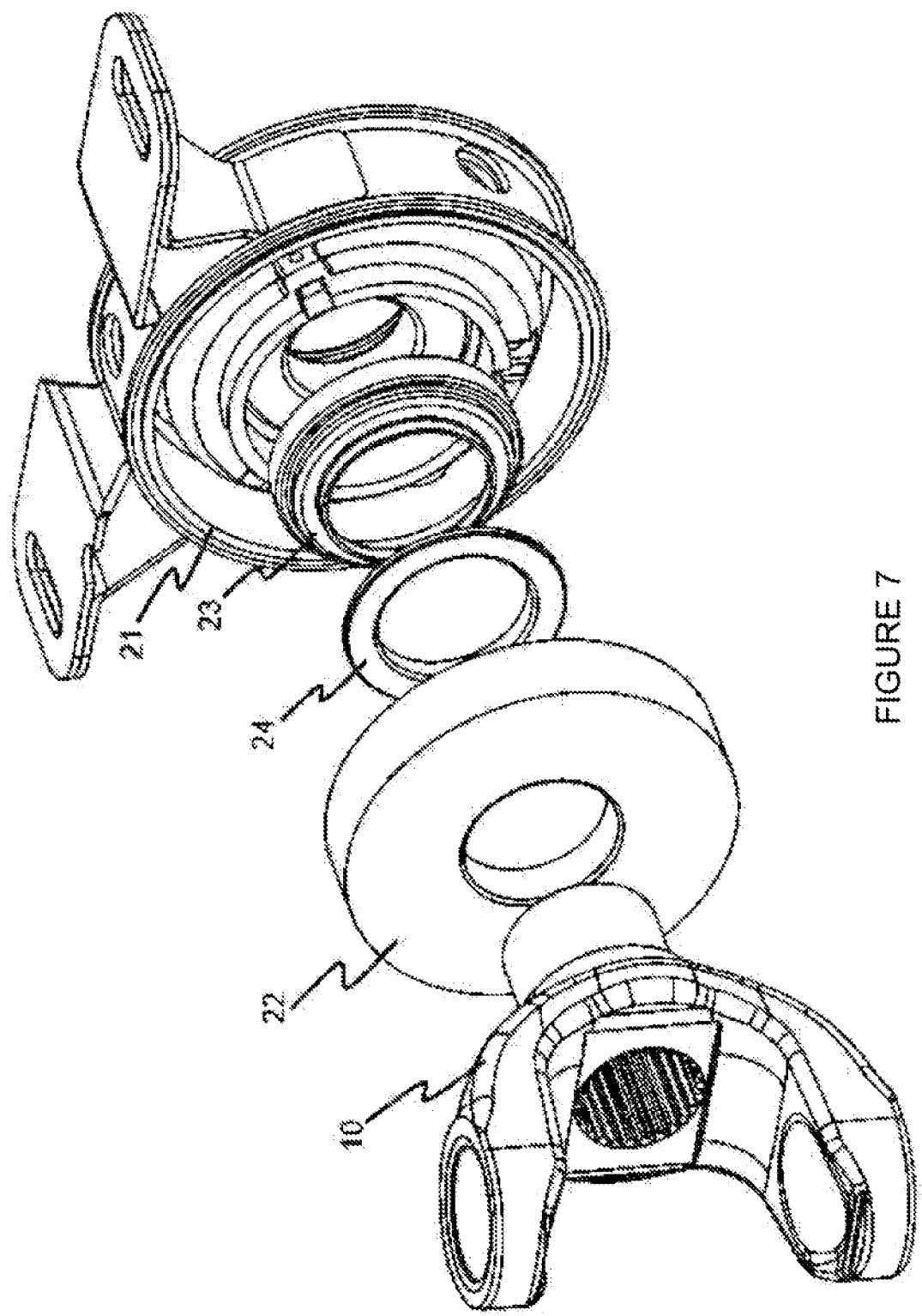
FIG. 7 is an exploded perspective view of the mechanical structure according to the invention.
Figure 8:
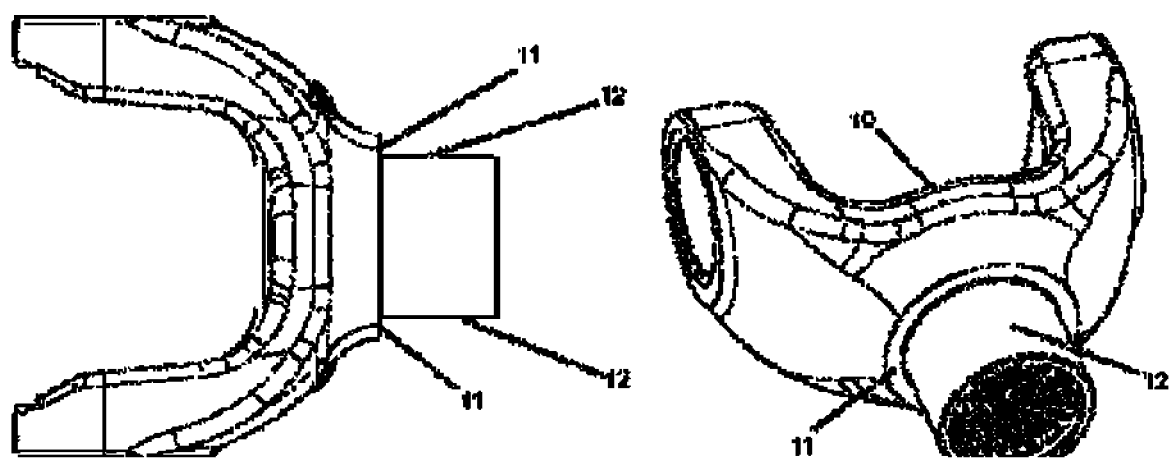
FIG. 8 is a perspective view of the cardan shaft element.

As shown in FIG. 4, the fixed carrier (23) is positioned on the central bearing (21) and the rotating carrier (24) is positioned on the mounting surface (12) located on the movable cardan shaft element (10). Thus, the hall sensor (40) is positioned on the cardan shaft, but the hall sensor does not rotate with the cardan shaft element (10). The magnet (30) integrated in the rotating carrier (24) is assembled on the movable cardan shaft element (10) and rotates with the cardan shaft. Thus, the hall sensor (40), which remains fixed while the cardan shaft is moving, continues to create pulses with the effect of the magnet (30). The distance between the hall sensor (40) and the magnet (30) is kept as short as possible according to the design and such that power transfer is enabled.

Referring to FIG. 5a, the fixed carrier (23) comprises a carrying surface (231) on which the hall sensor (40) is positioned with the central bearing mounting surface or surfaces (232) to be assembled on the central bearing (21).

The fixed carrier (23) is fixed onto the central bearing (21) by means of said central bearing central bearing mounting surfaces (232). The carrier surface (231) is designed to position the magnet (30) and the hall sensor (40) at the same level in order to ensure utmost magnetic interaction efficiency.

The protective element (22) carries the detection element (50) and at the same time protects the fixed carrier (23) and the rotating carrier (24) from environmental conditions. Thus, the detection element (50) and the magnet (30) and the hall sensor (40) can operate without being affected by environmental conditions. The protective element (22) may be formed of one or more parts. The protective element (22) is positioned on the mounting surface (12) of the cardan shaft element (10) and its position is fixed by contacting the retaining face (11) on the cardan shaft element (10). The protective element (22) comprises a first groove (221) configured to conform to the geometry of the central bearing (21) and a second groove (222) configured to conform to the geometry of the rotating carrier (224).

Thanks to the compact structure of the invention, the magnet (30) and the hall sensor (40) can be adapted to the cardan shaft such that they cannot be perceived from the outside. Thus, the mechanical structure (20) is seen as a natural extension of the cardan shaft.

Power can be transmitted wirelessly to the system according to the invention. According to this structure, coils, preferably wires wound around the fixed and rotating carrier (23, 24) are used in order to provide power transmission. The configuration mentioned in the utility model with the application number 2017/08500 of TURKPATENT can be used in order to provide the related wireless power transmission.

The invention is a method for determining the number of revolutions of the cardan shaft, at least one magnet (30) and at least one hall sensor (40), which is positioned to provide magnetic interaction between each other, is used; characterized by comprising the following steps;

a) connecting one of said magnet (30) and hall sensor (40) to a fixed point (SN) on the rotating elements of the cardan shaft, and
b) determining the number of pulses created by the hall sensor (40) and;
c) determining the number of revolutions by correlating the number of pulses with the number of revolutions.

According to said method, the magnet (30) or hall sensor (40) that has been positioned onto the rotating element of the cardan shaft or the hall sensor (40) or magnet (30) that has been positioned onto a fixed element on the cardan shaft, particularly the central bearing (21), encounter each other at each revolution when the cardan shaft starts rotating and at this point the hall sensor (40) creates a pulse. The pulse created is correlated with the cardan shaft revolution numbers by the detection element (50) and momentary revolution calculation can be performed.

The scope of protection of the invention is set forth in the attached claims and cannot be limited with the embodiments described in the detailed description. It is clear that a person skilled in the art can provide similar embodiments in the light of the foregoing without departing from the main theme of the invention.

The invention claimed is:

1. A method for determining a number of revolutions of a cardan shaft, the method comprising:
   providing at least one magnet and at least one Hall sensor;
   connecting one of the at least one magnet and the at least one Hall sensor onto a rotating element of the cardan shaft;
   connecting another of the at least one magnet and the at least one Hall sensor to a fixed point such that the at least one magnet and the at least one Hall sensor are magnetically interactive with each other;
   determining a number of pulses created by the at least one Hall sensor relative to a rotation of the cardan shaft; and
   determining a number of revolutions by correlating the number of pulses with the number of revolutions.

* * * * *